(12) United States Patent
Kim et al.

(10) Patent No.: US 8,689,939 B2
(45) Date of Patent: Apr. 8, 2014

(54) STEP APPARATUS FOR HEAVY CONSTRUCTION EQUIPMENT AND TREE HARVESTER HAVING LEVELING SYSTEM

(75) Inventors: In Woo Kim, Changwon-si (KR); Young Ok Park, Changwon-si (KR)

(73) Assignee: Volvo Construction Equipment Holding Sweden AB, Eskilstuna (SE)

( * ) Notice: Subject to any disclaimer, the term of this patent is extended or adjusted under 35 U.S.C. 154(b) by 837 days.

(21) Appl. No.: 12/471,099

(22) Filed: May 22, 2009

(65) Prior Publication Data
US 2009/0294213 A1 Dec. 3, 2009

(30) Foreign Application Priority Data

May 27, 2008 (KR) .................. 10-2008-0048976
Jun. 4, 2008 (KR) .................. 10-2008-0052641

(51) Int. Cl.
*E06C 5/00* (2006.01)

(52) U.S. Cl.
USPC .......................................... 182/127

(58) Field of Classification Search
USPC .................... 182/127, 88, 89, 85, 86
See application file for complete search history.

(56) References Cited

U.S. PATENT DOCUMENTS

| | | | | | |
|---|---|---|---|---|---|
| 2,642,217 | A | * | 6/1953 | Jennings ........................ | 182/88 |
| 4,185,849 | A | * | 1/1980 | Jaeger .......................... | 280/166 |
| 4,623,160 | A | * | 11/1986 | Trudell ......................... | 280/166 |
| 4,712,640 | A | * | 12/1987 | Leigh-Monstevens et al. ............................ | 180/336 |
| 4,971,168 | A | * | 11/1990 | Stanescu .......................... | 182/1 |
| 5,228,707 | A | * | 7/1993 | Yoder ........................... | 280/166 |
| 5,366,052 | A | * | 11/1994 | Keh-Lin ........................... | 182/88 |
| 5,547,040 | A | * | 8/1996 | Hanser et al. ................... | 182/88 |
| 5,632,591 | A | * | 5/1997 | Henriquez ...................... | 414/462 |
| 5,697,470 | A | * | 12/1997 | Carle .............................. | 182/88 |
| 6,422,342 | B1 | * | 7/2002 | Armstrong et al. ............ | 182/127 |
| 6,659,224 | B2 | * | 12/2003 | Medsker ........................ | 182/91 |
| 7,264,253 | B1 | * | 9/2007 | Cummings .................... | 280/163 |
| 7,441,820 | B1 | * | 10/2008 | Alvarado ........................ | 296/62 |
| 7,516,997 | B2 | * | 4/2009 | Kuznarik et al. ............... | 296/62 |
| 7,934,736 | B2 | * | 5/2011 | Kircher ......................... | 280/166 |
| 8,074,768 | B2 | * | 12/2011 | Rund .............................. | 182/86 |
| 2002/0014504 | A1 | * | 2/2002 | Hetu ............................. | 224/310 |
| 2006/0082079 | A1 | * | 4/2006 | Eichhorn et al. ............. | 280/6.155 |
| 2006/0181049 | A1 | * | 8/2006 | Kobayashi et al. ........... | 280/166 |
| 2007/0240936 | A1 | * | 10/2007 | Brookshire et al. .......... | 182/127 |
| 2007/0256893 | A1 | * | 11/2007 | Horn et al. .................... | 182/127 |
| 2010/0116590 | A1 | * | 5/2010 | Rund ............................. | 182/127 |

* cited by examiner

*Primary Examiner* — Charles A Fox
*Assistant Examiner* — Candace L Bradford
(74) *Attorney, Agent, or Firm* — Ladas & Parry LLP

(57) ABSTRACT

A step apparatus for heavy construction equipment and tree harvester having a leveling system for controlling a horizontal level of a cab and an upper frame is provided, which includes a step protector including a main body fixedly installed on one side of an upper frame, a step guide hole opened from an inside of the main body to an outside, a guide rail formed along a length direction of an inner side wall of the main body, and an insert hole formed on one side of the guide rail and open toward a vertically upward direction of the guide rail; a side step including a plurality of foot steps arranged at specified intervals on a step frame to form stairs, a step drawer formed on an upper part of the step frame and seated in the step guide hole, and a guide pin positioned adjacent to the step drawer and projected toward the side wall of the main body, wherein when the guide pin is slid along the guide rail, the step frame is seated in the main body or is drawn out from the inside of the main body; and a folding actuator including a cylinder rod coupled to the step drawer to be extended and contracted, the folding actuator drawing the step drawer to the inside of the main body of the step protector.

7 Claims, 17 Drawing Sheets

STEP APPARATUS FOR HEAVY CONSTRUCTION EQUIPMENT AND TREE HARVESTER HAVING LEVELING SYSTEM

CROSS-REFERENCE TO RELATED APPLICATION

This application is based on and claims priority from Korean Patent Application No. 10-2008-0048976 and 10-2008-0052641, filed on May 27, 2008 and Jun. 4, 2008, respectively in the Korean Intellectual Property Office, the disclosure of which is incorporated herein in its entirety by reference.

BACKGROUND OF THE INVENTION

1. Field of the Invention

The present invention relates to a step apparatus for heavy construction equipment and tree harvester having a leveling system, and more particularly to a step apparatus for heavy construction equipment and tree harvester having an improved leveling system, which can prevent a collision with an external obstacle or a lower driving structure by making the step apparatus in a step protector drawn out and seated in foldable steps even if an upper swing structure is tilted in an inclined workplace or is in a tilted state against the lower driving structure through operation of the leveling system.

2. Description of the Prior Art

Conventionally, heavy construction equipment and tree harvester having a leveling system, e.g. an excavator and tree harvester having a leveling system, can safely perform logging works or engineering works in a workplace having severe inclination or on the inclined ground, such as a slop, a hill, and the like.

If an upper frame including a cab and a working device is tilted at a specified angle due to the inclination of the workplace, a leveling system lifts up or pulls one lower side of the upper frame to offset the inclination, and thus the cab and the upper frame is kept roughly in a parallel state to a horizontal surface.

According to the heavy construction equipment and tree harvester having a leveling system as described above, since the height of structures mounted on the upper frame, such as the cab, engine room, and the like, is relatively high, the operator's approach to such structure for getting on or off the equipment is lowered, and the maintenance and repair work becomes difficult.

In consideration of the above-described drawbacks, a fixed step apparatus having foot steps or a step plate provided on one side of the upper frame to form stairs for getting on or off the equipment, has been widely used.

The conventional fixed step apparatus is a kind of step structure in which the step frame and foot steps hang down from one side of the upper frame, and are in a standing posture toward the lower driving structure or the upper swing structure.

Accordingly, the conventional fixed step apparatus is always in an exposed state as a step structure, without being affected by the change of the operation position of a safety lever typically installed in the cab, and thus an operator can keep the approach to various structures mounted on the upper swing structure, such as the cab, engine room, and the like.

FIG. 1 is a perspective view illustrating the use state of a conventional fixed step apparatus installed in heavy construction equipment and tree harvester having a leveling system, and FIG. 2 is a schematic perspective view of a conventional fixed step apparatus.

According to the heavy construction equipment and tree harvester having a leveling system as illustrated in FIG. 1, a leveling device 14 is installed between an upper frame 1 and a lower driving structure 2, and a cab 9, a boom 12 having a working device 13 such as a logging device or a bucket, and an engine room 11 are installed on an upper part of the upper frame 1. Also, in order for an operator to approach the cab 9, a step apparatus 10 is fixed to one side surface of the upper frame 1.

The conventional fixed step apparatus 10, as illustrated in FIG. 2, has a structure in which a stopper unit 3 is provided on one side of the upper frame 1, and a step frame hanger 6 having foot steps 5 hangs on the stopper unit 3.

Also, pinholes 4 for fixing the position of the step frame are formed on the step frame hanger 6. In the case of selectively fixing the step frame 7 in a standing posture so that the step frame 7 is headed upward from the upper part of the upper frame 1, stoppers 8 of the stopper unit 3 are inserted into the pinholes 4 of the step frame hanger 6, and thus the step frame 7 on the upper part of the upper frame 1 is kept in a standing posture.

Typically, in the case where the equipment such as an excavator having a leveling system performs work in an inclined area, the upper frame 1 is kept in a horizontal state that substantially corresponds to a horizontal surface H for prevention of overturn and work safety of the equipment, while the lower driving structure 2 is in an inclined state.

Also, the step apparatus 10 is fixed to be exposed from the upper frame 1, and if it is intended to adjust the exposed state of the step apparatus 10, the fixing position of the step frame 7 should be adjusted in a state where a safety lever is set to an operation mode.

However, the conventional step apparatus has the problem that, although the fixing position of the step frame 7 is adjusted, the step apparatus 10 is still exposed to an outside, and thus interference or collision may occur between the step apparatus and an external object or the lower driving structure.

For example, the conventional fixed step apparatus has severe problem that, when the upper swing structure and the upper frame are inclined or tilted at a preset angle due to an inclined ground surface, the step frame is projected toward the lower driving structure, and thus collision occurs between one side of the step frame and the lower driving structure to cause damage of the step frame and the lower driving structure.

Also, even in the case where the conventional step apparatus is fixed to the upper part of the upper frame in a standing posture by the stoppers to prevent collision between the step frame and the lower driving structure, collision may still occur between the step frame and an external object during working of the equipment.

The conventional fixed step apparatus also has severe problems that, in the case of adjusting the setting position of the step apparatus before leveling control of the upper frame or during working of the equipment, an operator should manually adjust the positions of the step frame and the steps up and down in a state where the operator directly hangs on the upper frame, and thus the manipulation performance is lowered with the operator's safety threatened.

SUMMARY OF THE INVENTION

Accordingly, the present invention has been made to solve the above-mentioned problems occurring in the prior art while advantages achieved by the prior art are maintained intact.

One object of the present invention is to provide a step apparatus for heavy construction equipment and tree harvester having a leveling system, which can prevent a collision with a lower driving structure even if an upper frame is tilted by making a step frame kept in a step protector in a foldable manner and making the step frame form stairs on an outer side of the upper frame when in use.

Another object of the present invention is to provide a step apparatus for heavy construction equipment and tree harvester having a leveling system, which can remove interference or conflict between the step apparatus and the lower driving structure and collision between the step apparatus and an external object even if the upper frame is tilted by forming inclined steps that are projected to a side of the upper frame to secure the visual field of an operator.

Still another object of the present invention is to provide a step apparatus for heavy construction equipment and tree harvester having a leveling system, which can selectively adjust the keeping and exposing of a step frame by hydraulic pressure when a safety lever is set to a safety mode.

In the following description of the present invention, it could be commonly understood by those ordinary skilled in the art to which the present invention belongs that the term "folding" includes a process in which the step frame is rotated or folded and is drawn out from or seated in the step protector, and the term "exposure" includes a process in which the step frame and foot steps are drawn out from the step protector or are set in the form of stairs on the outside of the step protector.

In order to accomplish these objects, there is provided a step apparatus for heavy construction equipment and tree harvester having a leveling system, according to an embodiment of the present invention, which includes a step protector including a main body fixedly installed on one side of an upper frame, a step guide hole opened from an inside of the main body to an outside, a guide rail formed along a length direction of an inner side wall of the main body, and an insert hole formed on one side of the guide rail and open toward a vertically upward direction of the guide rail; a side step including a plurality of foot steps arranged at specified intervals on a step frame to form stairs, a step drawer formed on an upper part of the step frame and seated in the step guide hole, and a guide pin positioned adjacent to the step drawer and projected toward the side wall of the main body, wherein when the guide pin is slid along the guide rail, the step frame is seated in the main body or is drawn out from the inside of the main body; and a folding actuator including a cylinder rod coupled to the step drawer to be extended and contracted, the folding actuator drawing the step drawer to the inside of the main body of the step protector.

A slit may be formed adjacent to the step guide hole on a main body bottom part of the step protector, and one side of the step frame may be slid up and down by the slit.

The step guide hole may be penetratingly formed on a side part in the length direction of the main body of the step protector.

A step support may be attached to one side of the main body bottom part of the step protector, and may have an inclined support part adjacent to the slit, wherein when the step frame stands up toward a lower part of the main body of the step protector, the step frame is supported at specified inclination by the inclined support part.

The inclined support part may be formed to be tilted in an angle range of about 65° to 80° against a horizontal surface formed in the length direction of the main body bottom part of the step protector.

The folding actuator may be rotatably fixed to a first mounting flange formed inside the main body, and the cylinder rod may be rotatably fixed to a second mounting flange formed on one side of the step drawer.

A handle may be formed on one side of the step frame.

A safety cover may be installed on a lower part of the step frame.

The step apparatus according to an embodiment of the present invention may further include a safety lever installed inside the cab to change a present mode to a safety mode or an operation mode, wherein if the safety lever is in the safety mode, the step frame is folded outside the main body of the step protector by the driving of the folding actuator, while if the safety lever is in the operation mode, the step frame is unfolded and seated inside the main body of the step protector by the driving of the folding actuator.

In another aspect of the present invention, there is provided a step apparatus for heavy construction equipment and tree harvester having a leveling system, which includes a step protector including a cylinder fixing holder formed inside a protector housing, first and second fixing lugs respectively formed apart from the cylinder fixing holder along a length direction of the protector housing, and a step protection cover attached to a lower part of the protector housing and having a step receiving hole penetratingly formed thereon to communicate with an inner part of the protector housing, the step protector being fixedly installed on one side of an upper frame; a first step frame including a first lug support flange coupled to the first fixing lug, and a plurality of step support flanges formed apart from the first lug support flange, wherein the first lug support flange and the first fixing lug are rotatably fixed to each other; a second step frame including a second lug support flange coupled to the second fixing lug, a plurality of step support flanges formed apart from the second lug support flange, and a fixing cam formed adjacent to the second lug support flange to support a rotating force generated about a rotating shaft formed on the second lug support flange, wherein the second lug support flange and the second fixing lug are rotatably fixed to each other; foot steps fixed to the plurality of step support flanges formed in the first step frame and the second step frame, respectively; and a folding actuator including a rod that can be extended and contracted, and having one side connected to the cylinder fixing holder and the other side connected to the fixing cam, the folding actuator providing the rotating force to the fixing cam by a predetermined pressure.

At least one of the first and second step frames may have a projection angle $\theta 2$ and may be fixed with an inclination so that at least one of the foot steps is projected to an outside of an outer wall of the step housing when the first and second step frames are exposed to an outside of the step protector at maximum.

The projection angle $\theta 2$ of the step frame may be in the range of 5° to 40°.

The fixing cam may be formed in a body with the second step frame.

The fixing cam may be formed in a body with the second lug support flange.

The foot step may be supported on one side of a support link that is rotatably shaft-engaged with the step support flange.

A safety cover may be further installed on a lower part of the foot step.

The step apparatus according to an embodiment of the present invention may further include a safety lever installed inside the cab to change a present mode to a safety mode or an operation mode, wherein if the safety lever is in the safety mode, the second step frame is drawn out to an outside of the step protector by the driving of the folding actuator, while if the safety lever is in the operation mode, the second step frame is rotated and folded inside the step protector by the driving of the folding actuator.

The folding actuator may include a hydraulic cylinder that is extended and contracted.

The first step frame may be installed on the step receiving hole when the second step frame is folded and fixed inside the protector housing.

The safety cover may be installed on the step receiving hole when the second step frame is folded and fixed inside the protector housing.

BRIEF DESCRIPTION OF THE DRAWINGS

The above and other objects, features and advantages of the present invention will be more apparent from the following detailed description taken in conjunction with the accompanying drawings, in which:

FIGS. 13A to 13D are views schematically illustrating a state where an outer wall of a protector housing is removed, in which:

FIG. 13A is a schematic view illustrating a state where step frame and foot steps are folded and seated inside a step protector;

FIGS. 13B and 13C are schematic views illustrating a state where a step frame and foot steps are rotated toward the outside and inside of a step protector by the driving of a folding actuator; and FIG. 13D is a schematic view illustrating a state where a step frame and foot steps are fully exposed to form stairs.

DETAILED DESCRIPTION OF THE PREFERRED EMBODIMENTS

Hereinafter, a leveling apparatus for excavator and forestry machine equipment according to preferred embodiments of the present invention will be described with reference to the accompanying drawings. The matters defined in the description, such as the detailed construction and elements, are nothing but specific details provided to assist those of ordinary skill in the art in a comprehensive understanding of the invention, and thus the present invention is not limited thereto.

Figure 1:
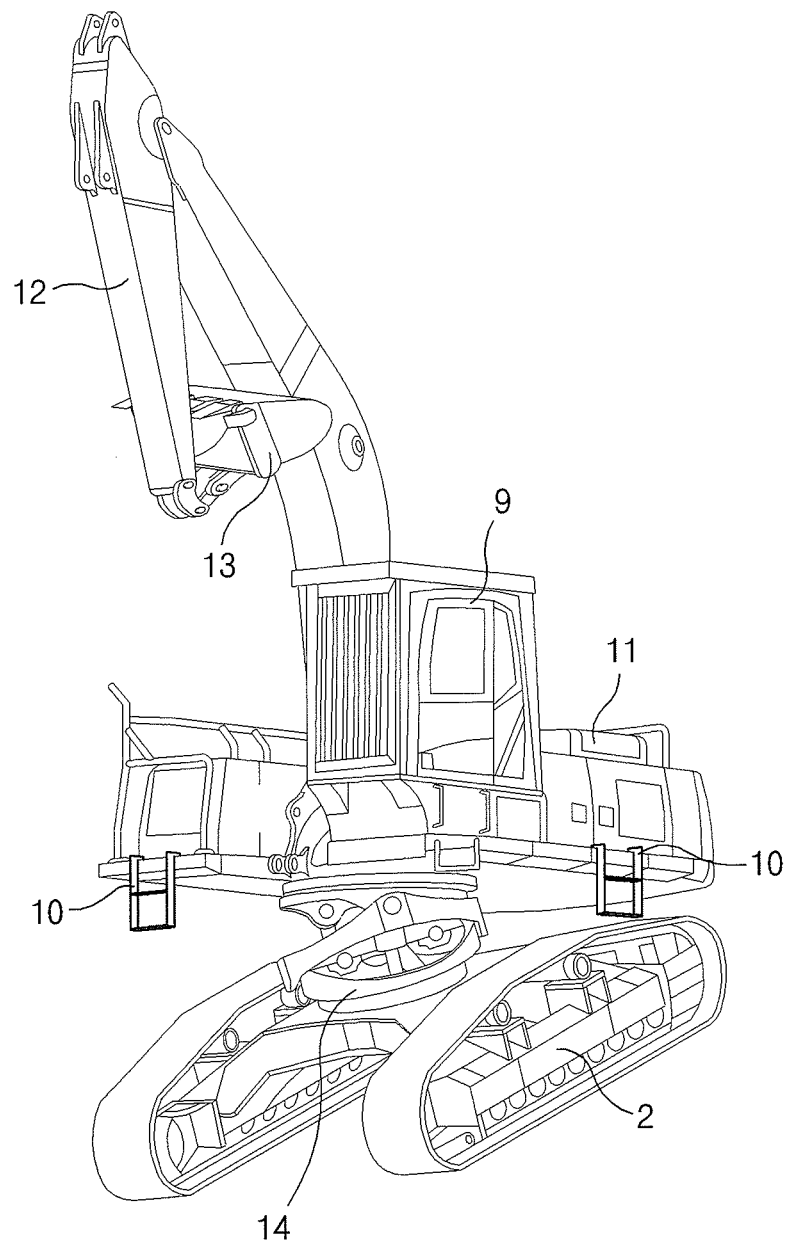
FIG. 1 is a perspective view illustrating the use state of a conventional fixed step apparatus installed in heavy construction equipment and tree harvester having a leveling system.
Figure 2:
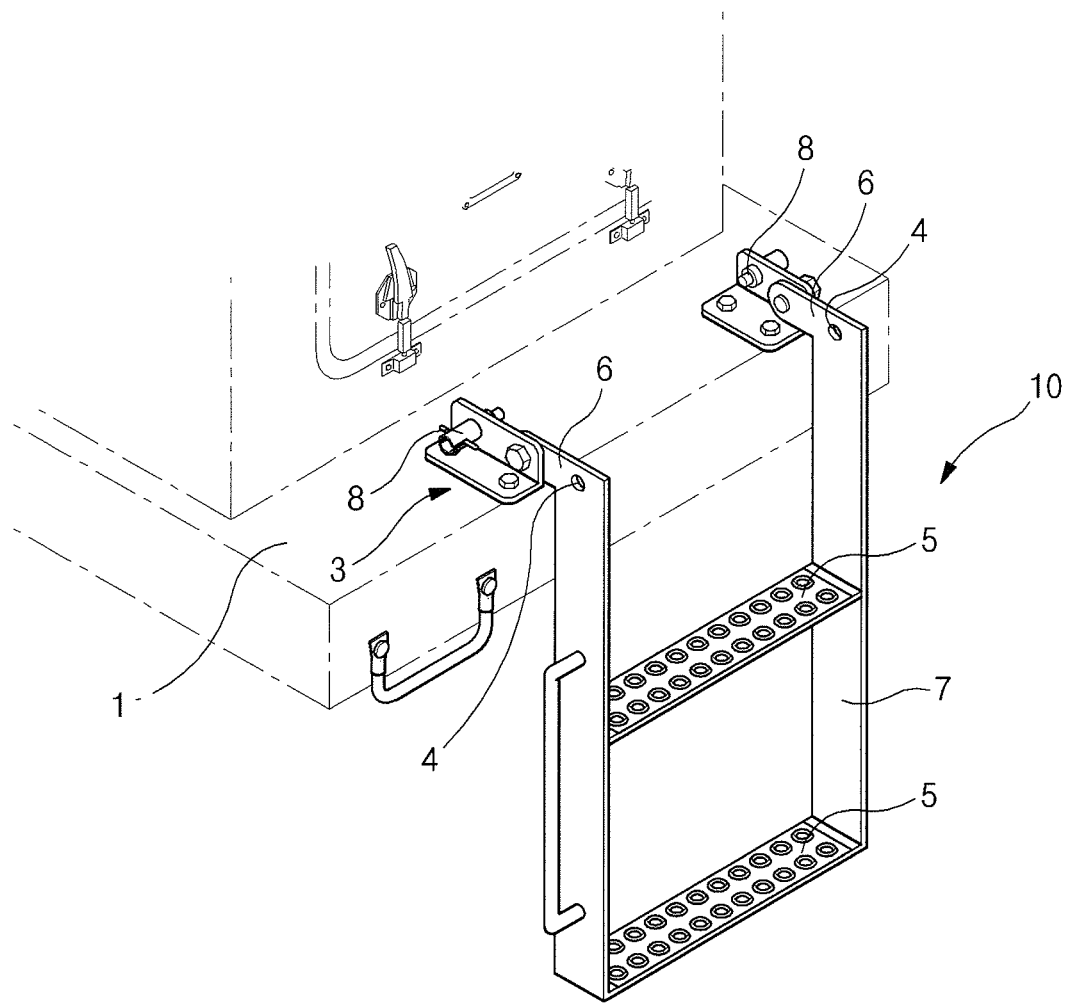
FIG. 2 is a schematic perspective view of a conventional fixed step apparatus.
Figure 3:
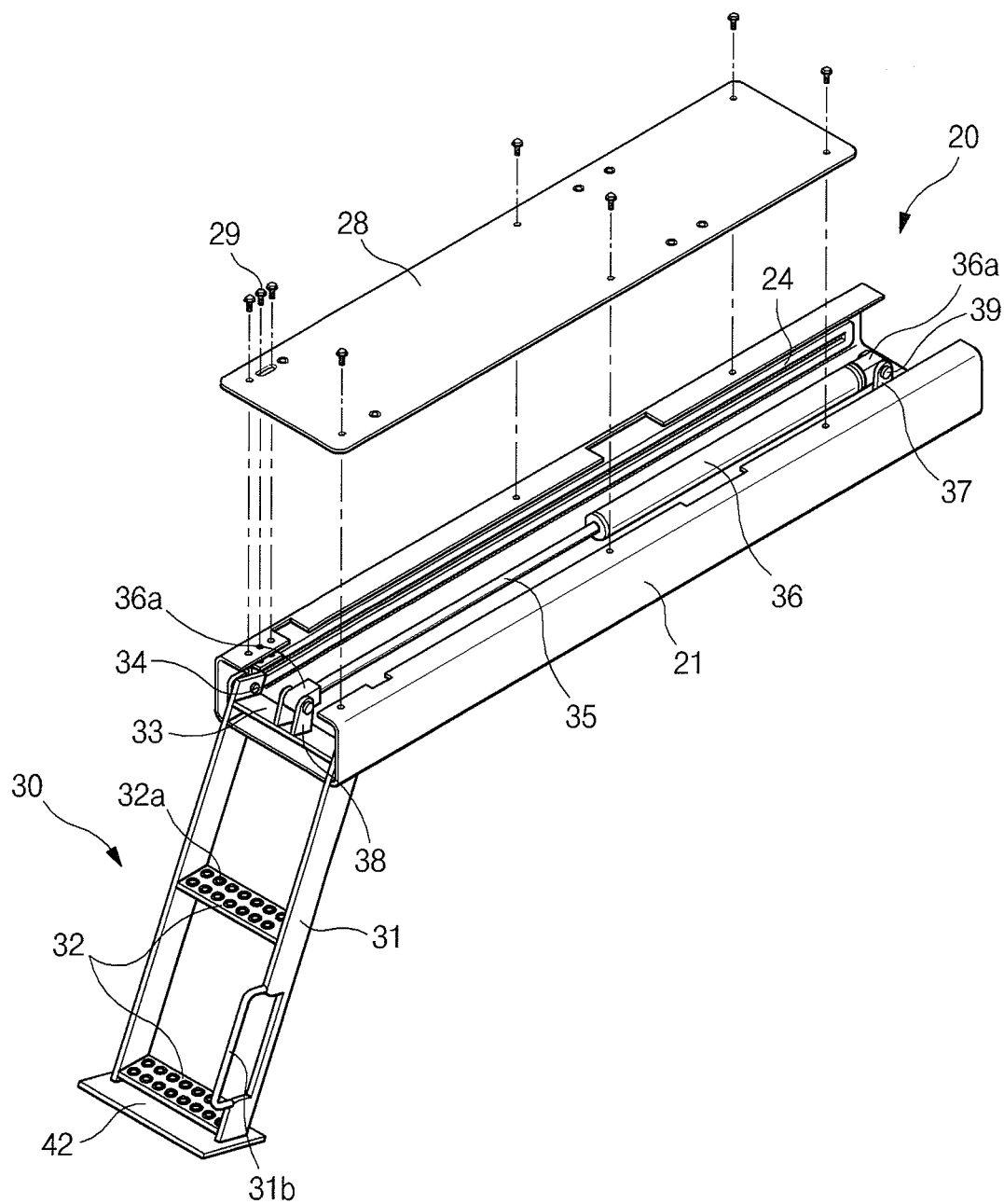
FIG. 3 is an exploded perspective view of a step apparatus for heavy construction equipment and tree harvester having a leveling system, in which a step frame is folded inside a step protector, according to an embodiment of the present invention.
Figure 4:
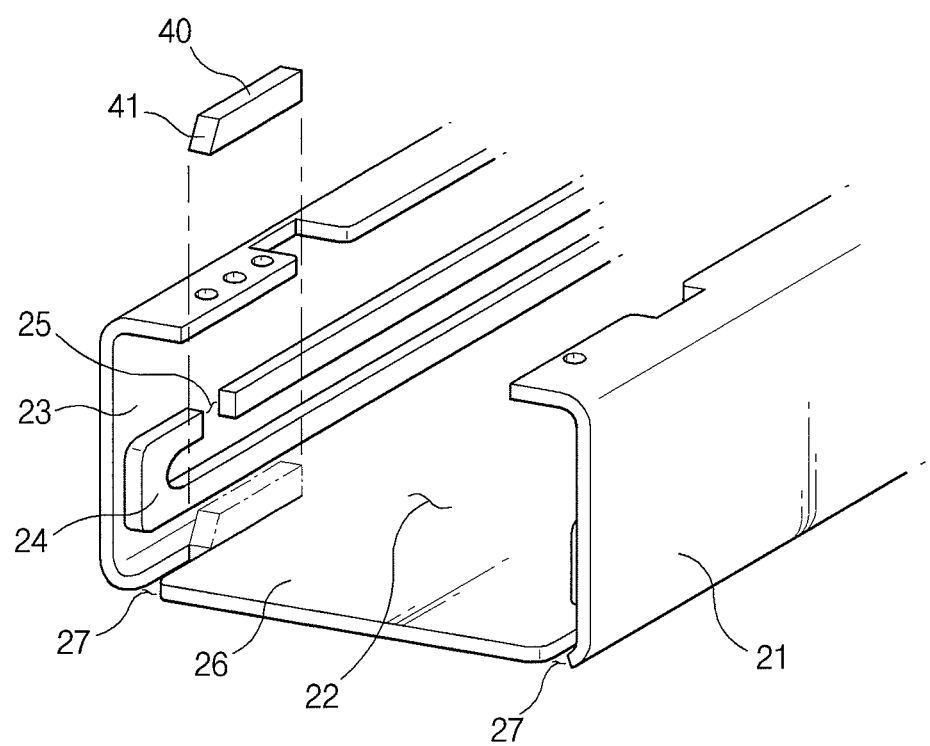
FIG. 4 is an enlarged perspective view illustrating an inside of a guide hole of a step protector main body, from which a step frame as illustrated in FIG. 3 has been removed.
Figure 5A:
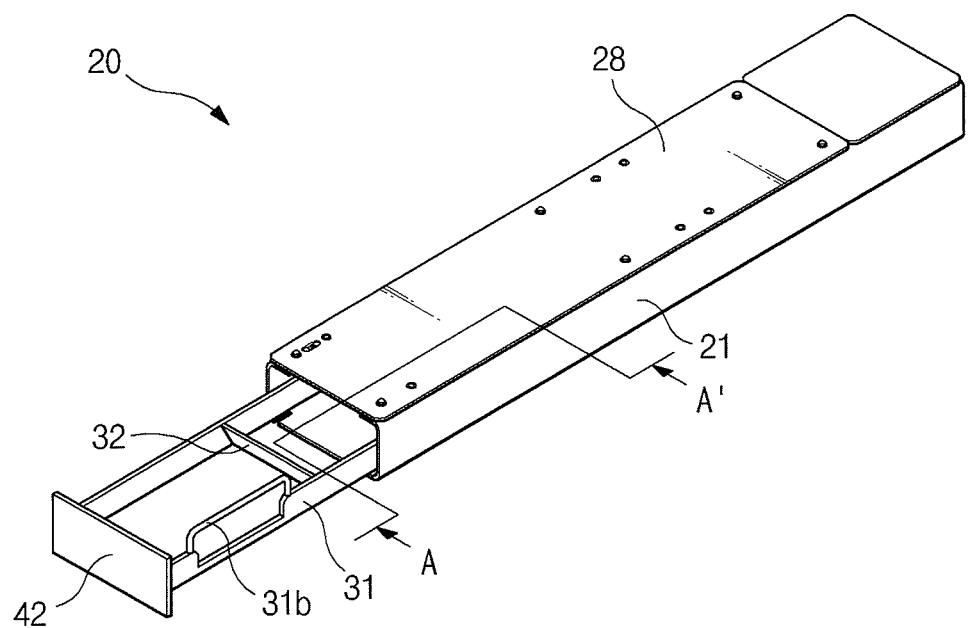
FIG. 5A is a perspective view illustrating a sliding state of a step frame that moves by extension and contraction operation of a folding actuator as illustrated in FIG. 3.
Figure 5B:
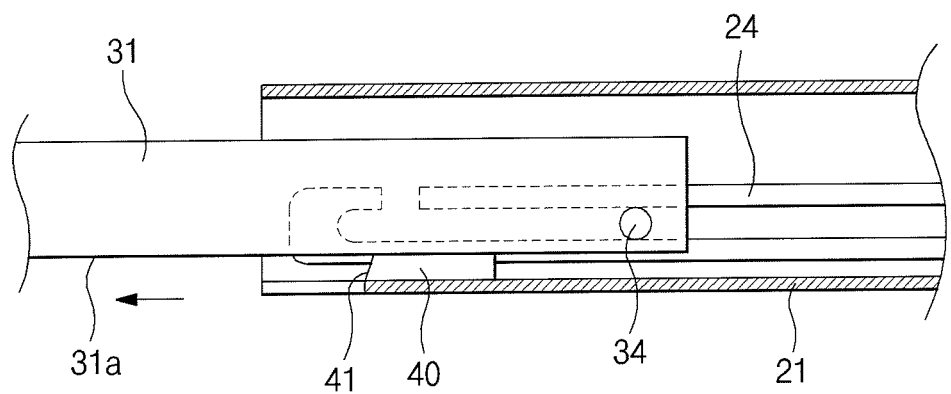
FIG. 5B is a sectional view, taken along line A-A' in FIG. 5A.
Figure 6A:
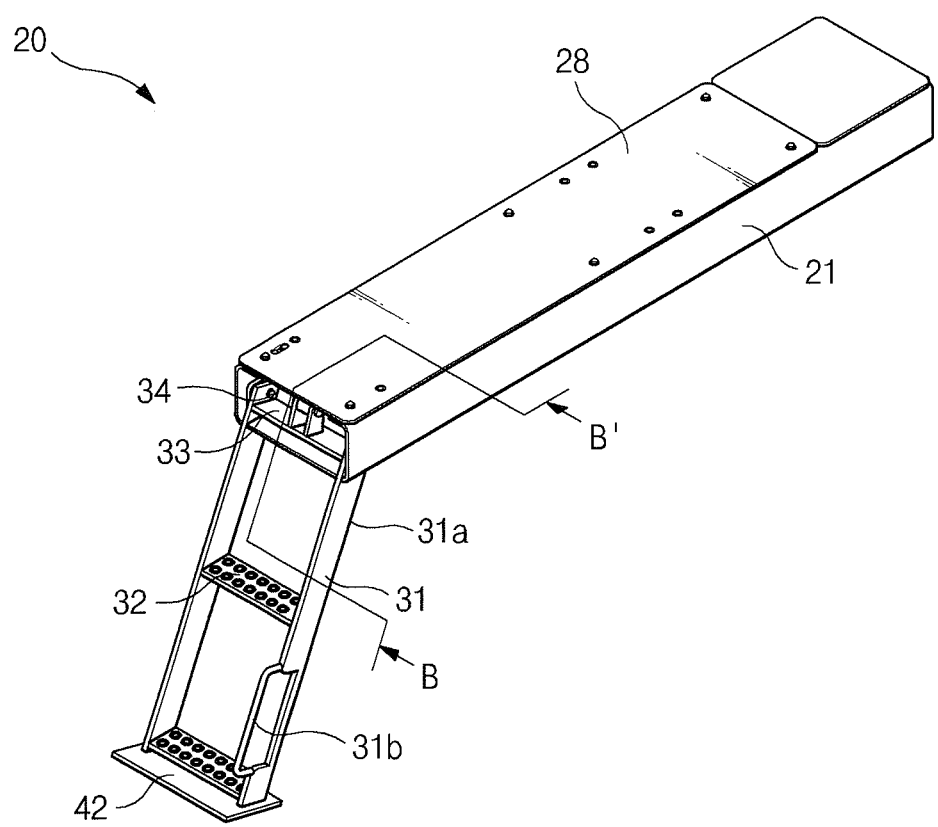
FIG. 6A is a perspective view illustrating a folding state of a step frame folded in a lower part of a step protector main body.
Figure 6B:
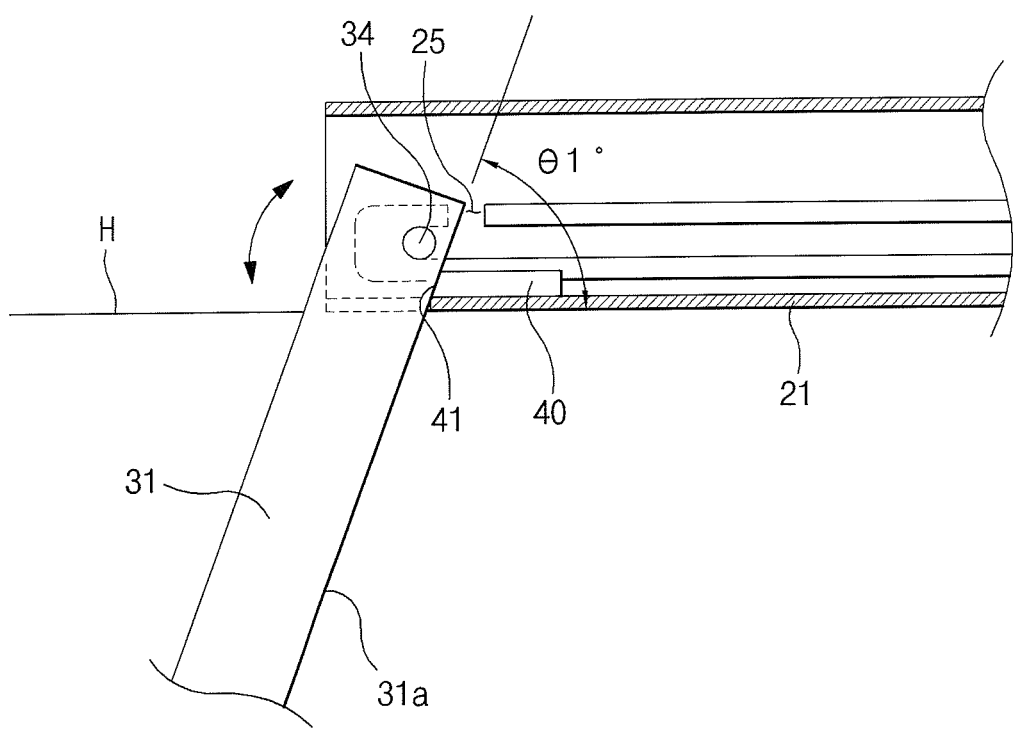
FIG. 6B is a sectional view, taken along line B-B' in FIG. 6A.
Figure 7:
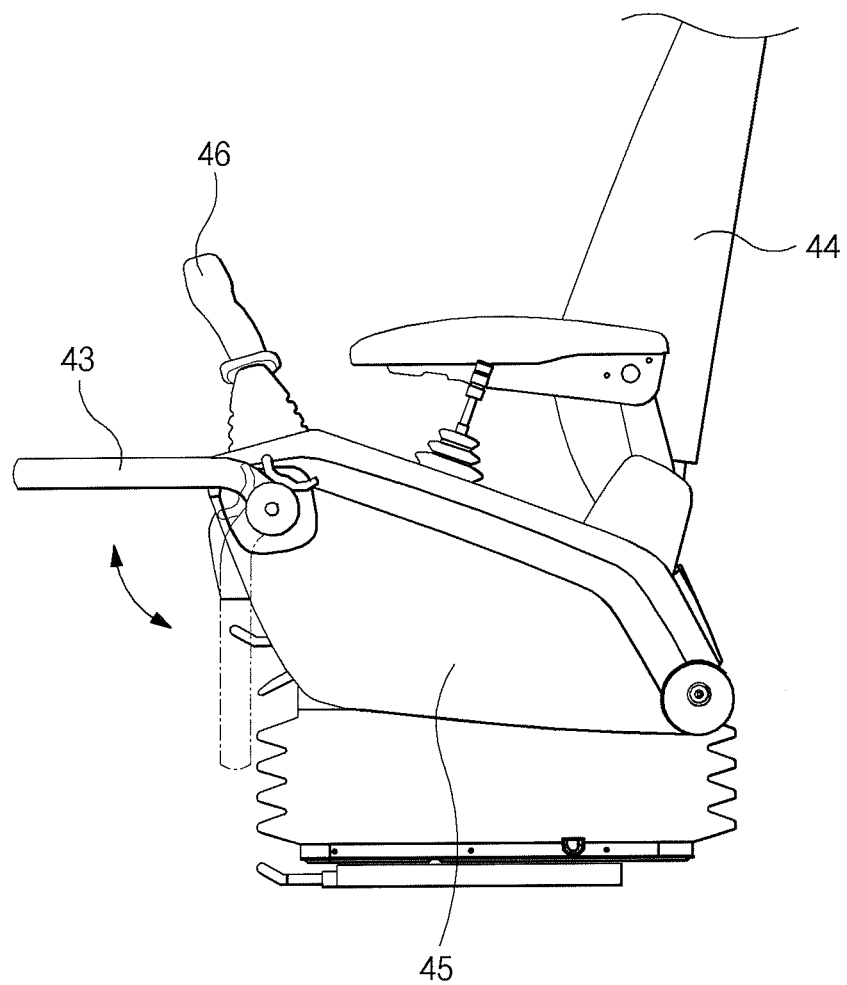
FIG. 7 is a schematic view illustrating an example of a safety lever installed inside a cab.
Figure 8:
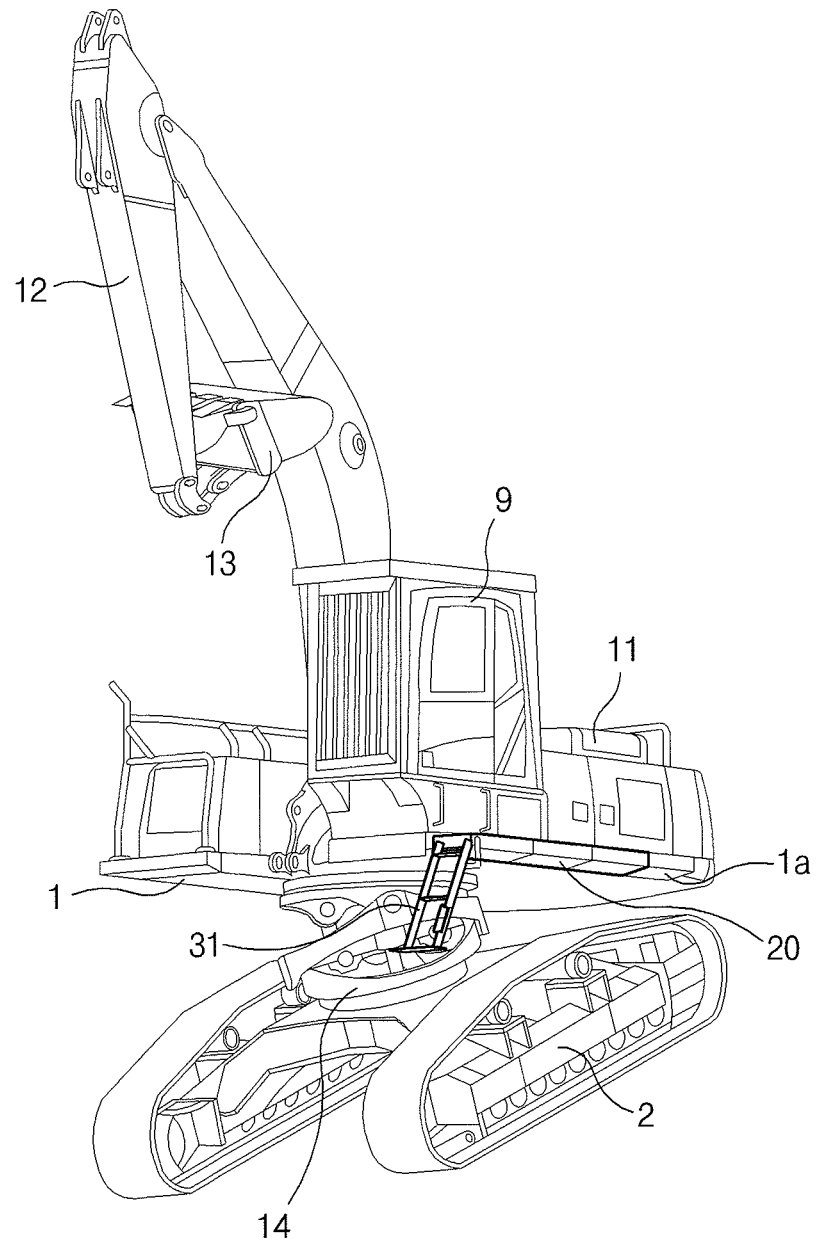
FIG. 8 is a schematic perspective view of a step apparatus attached to a side protector of an upper frame according to an embodiment of the present invention.
Figure 9:
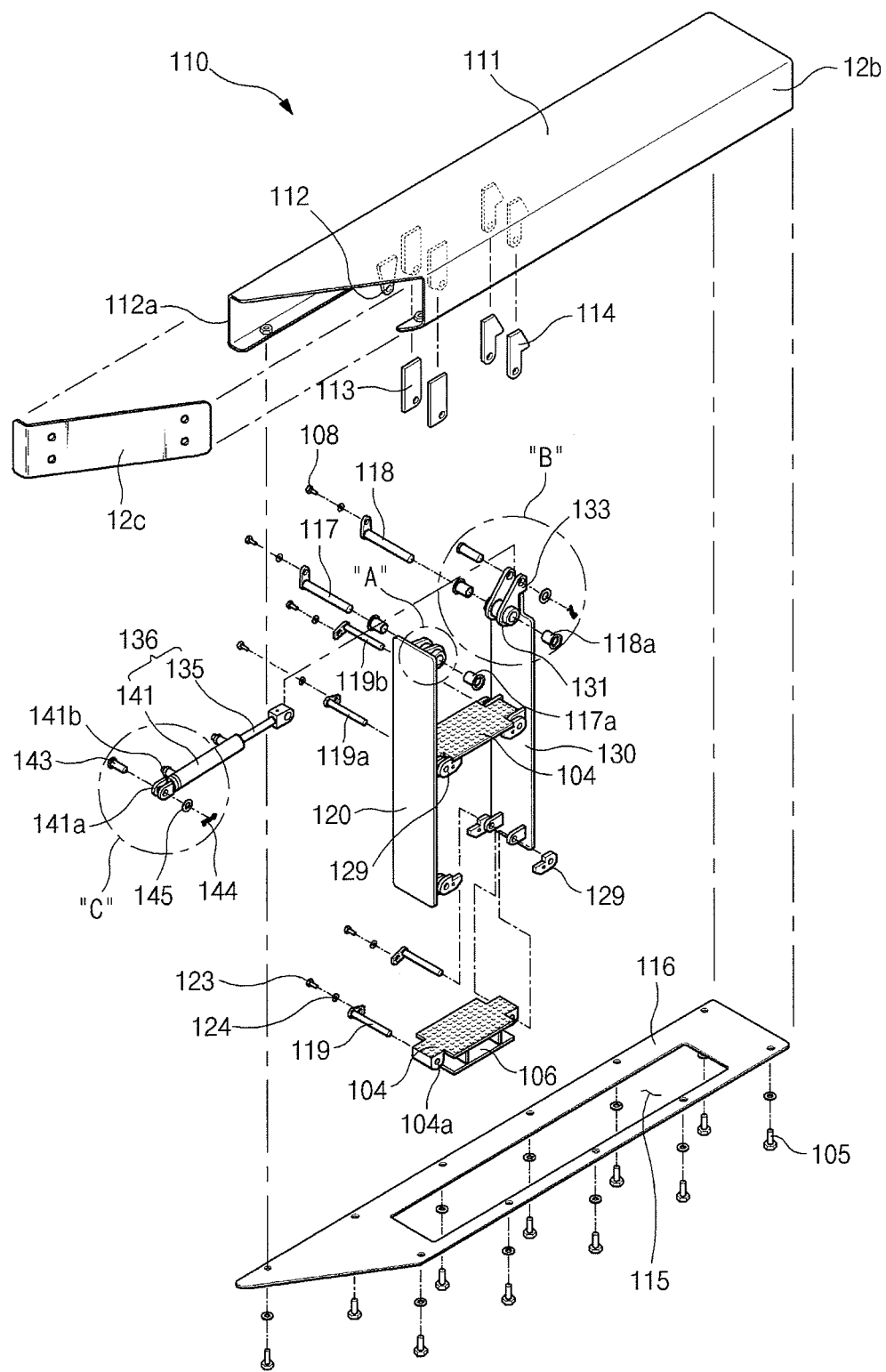
FIG. 9 is an exploded perspective view of a step apparatus for heavy construction equipment and tree harvester having a leveling system according to another embodiment of the present invention.
Figure 10A:
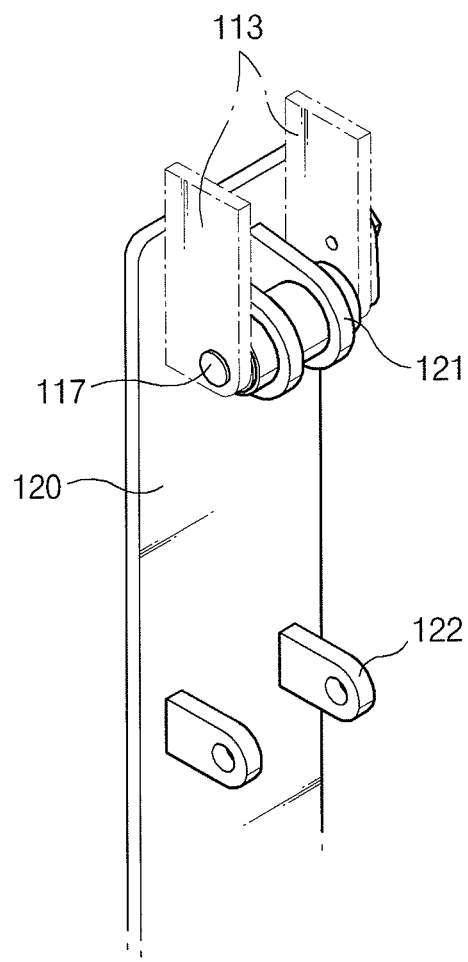
FIG. 10A is a partial enlarged view illustrating an upper part of a first step frame as indicated as "A" in FIG. 9.
Figure 10B:
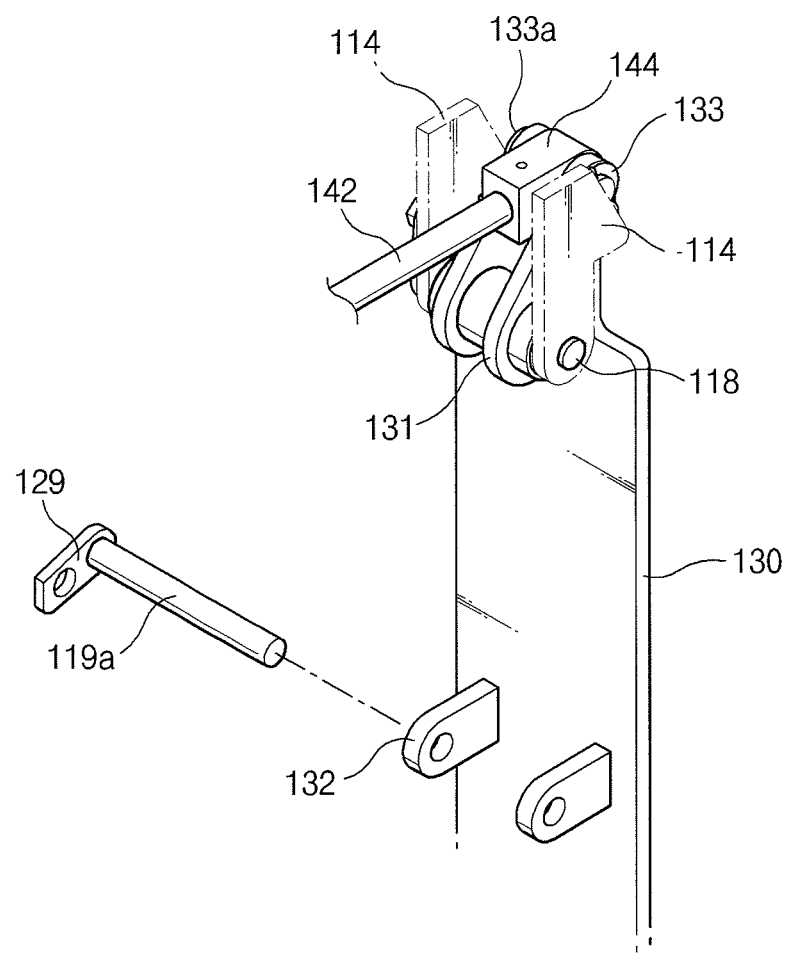
FIG. 10B is a partial enlarged view illustrating an upper part of a second step frame as indicated as "B" in FIG. 9.
Figure 10C:
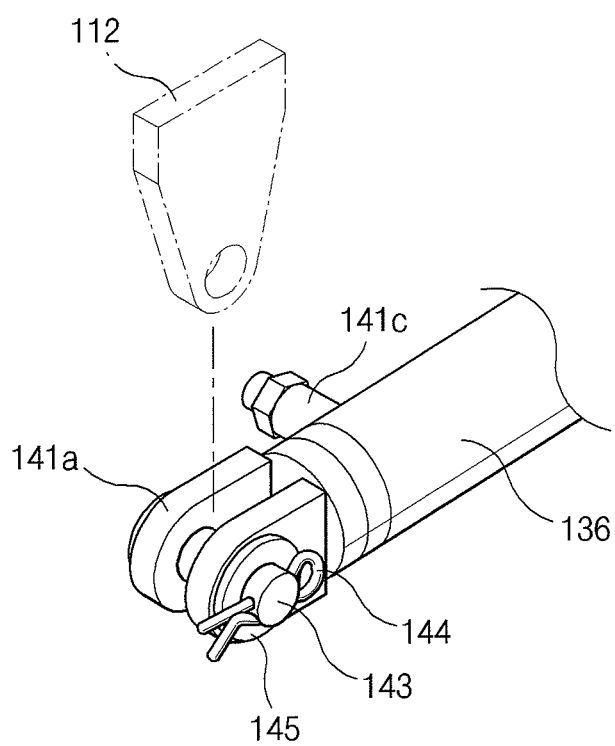
FIG. 10C is a partial enlarged view illustrating a fixing part of a folding actuator as indicated as "C" in FIG. 1.
Figure 11:
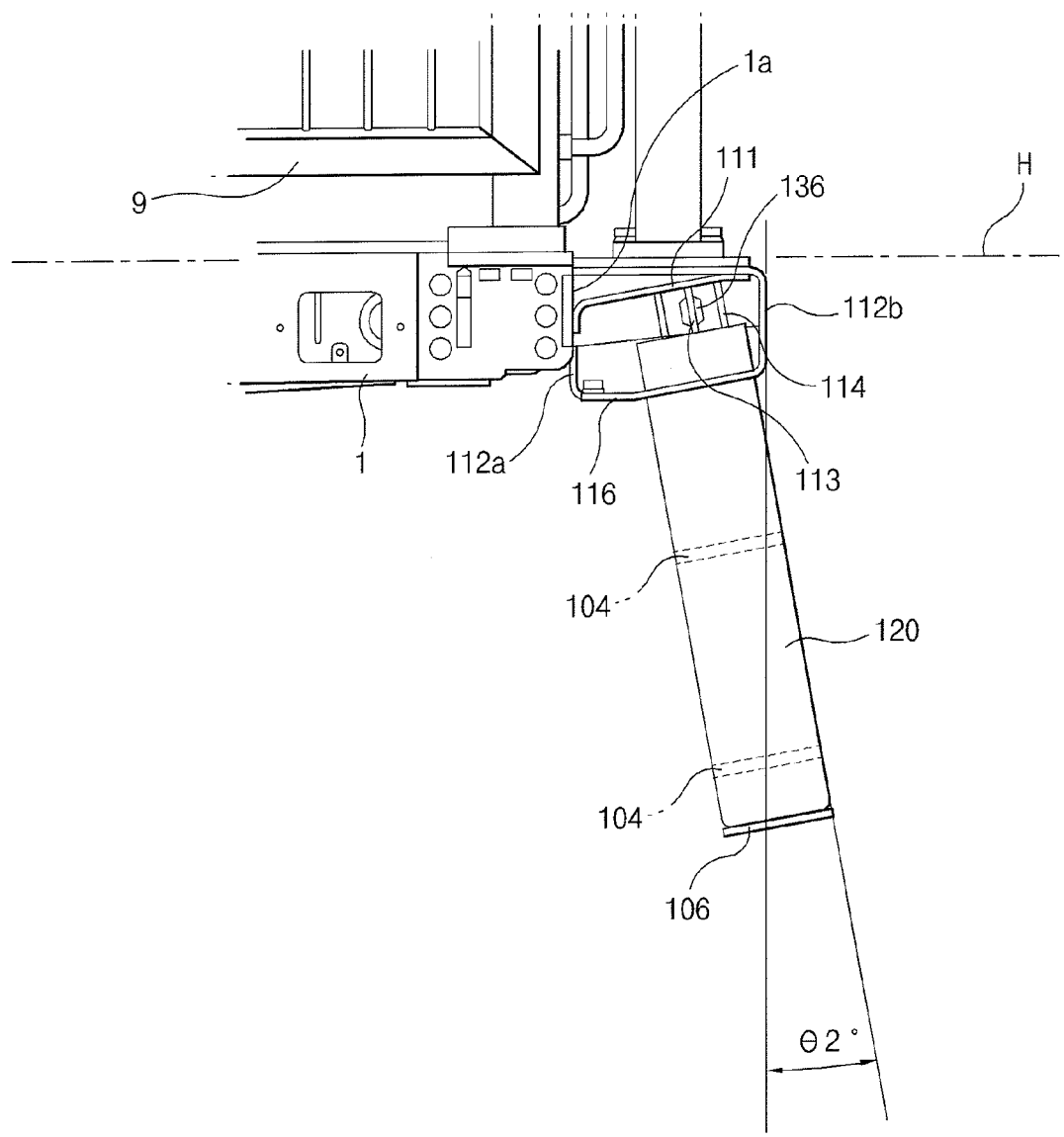
FIG. 11 is a schematic view illustrating an exposed state of foot steps and a step frame projected to the side of an upper frame.
Figure 12:
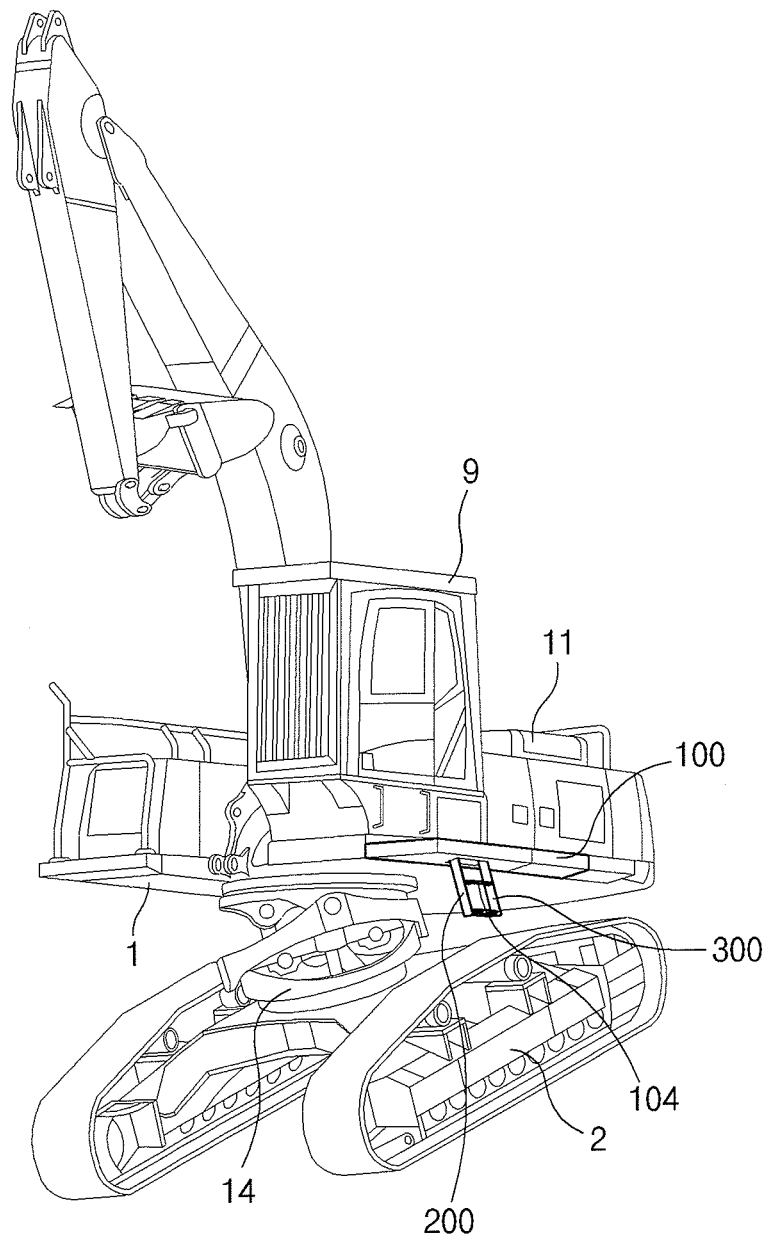
FIG. 12 is a perspective view schematically illustrating an installation state of a step apparatus for heavy construction equipment and tree harvester having a leveling system according to still another embodiment of the present invention.
Figure 13A:
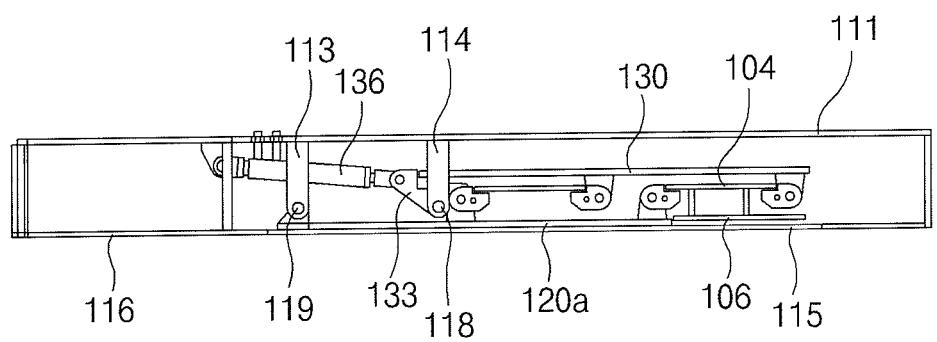
Figure 13B:
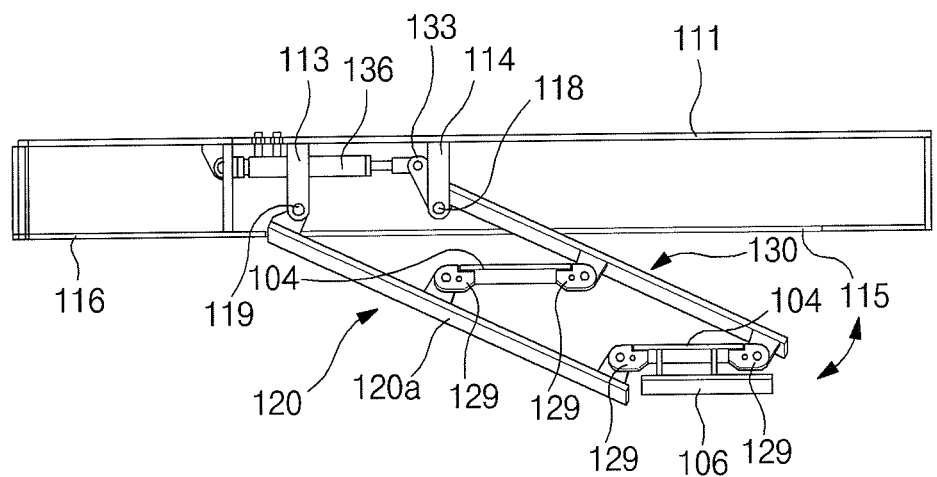
Figure 13C:
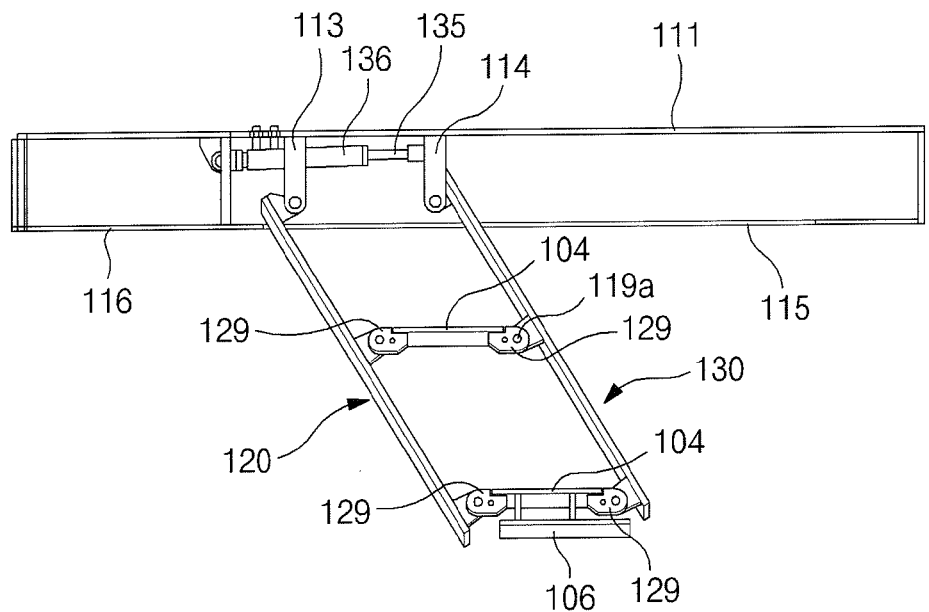
Figure 13D:
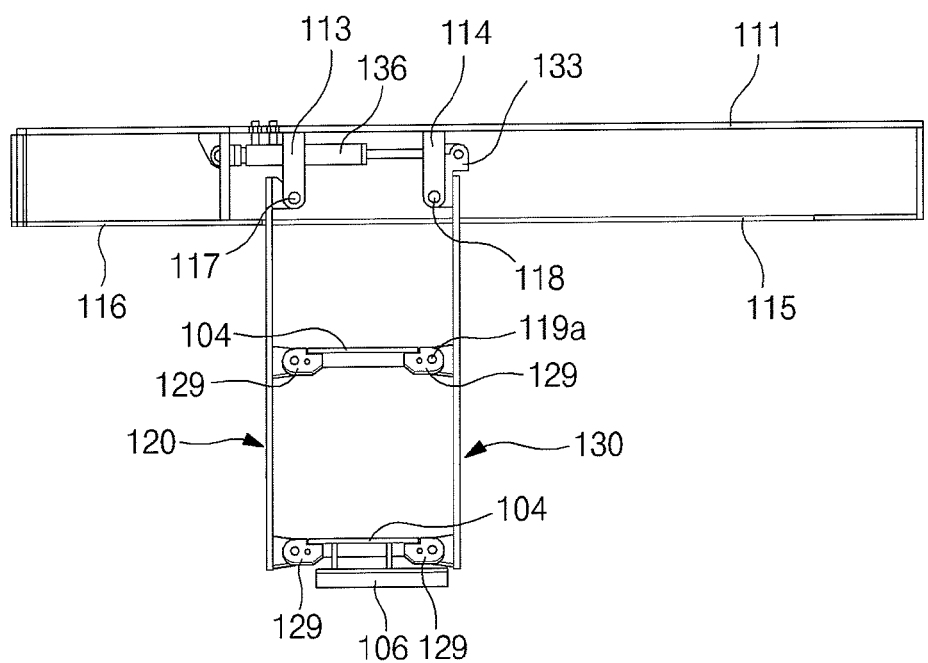

FIG. 1 is a perspective view illustrating the use state of a conventional fixed step apparatus installed in heavy construction equipment and tree harvester having a leveling system, FIG. 2 is a schematic perspective view of a conventional fixed step apparatus. FIG. 3 is an exploded perspective view of a step apparatus for heavy construction equipment and tree harvester having a leveling system, in which a step frame is folded inside a step protector, according to an embodiment of the present invention, and FIG. 4 is an enlarged perspective view illustrating an inside of a guide hole of a step protector main body, from which a step frame as illustrated in FIG. 3 has been removed. FIG. 5A is a perspective view illustrating a sliding state of a step frame that moves by extension and contraction operation of a folding actuator as illustrated in FIG. 3, and FIG. 5B is a sectional view, taken along line A-A' in FIG. 5A. FIG. 6A is a perspective view illustrating a folding state of a step frame folded in a lower part of a step protector main body, and FIG. 6B is a sectional view, taken along line B-B' in FIG. 6A. FIG. 7 is a schematic view illustrating an example of a safety lever installed inside a cab, and FIG. 8 is a schematic perspective view of a step apparatus attached to a side protector of an upper frame according to an embodiment of the present invention. FIG. 9 is an exploded perspective view of a step apparatus for heavy construction equipment and tree harvester having a leveling system according to another embodiment of the present invention. FIG. 10A is a partial enlarged view illustrating an upper part of a first step frame as indicated as "A" in FIG. 9, FIG. 10B is a partial enlarged view illustrating an upper part of a second step frame as indicated as "B" in FIG. 9, and FIG. 10C is a partial enlarged view illustrating a fixing part of a folding actuator as indicated as "C" in FIG. 1. FIG. 11 is a schematic view illustrating an exposed state of foot steps and a step frame projected to the side of an upper frame. FIG. 12 is a perspective view schematically illustrating an installation state of a step apparatus for heavy construction equipment and tree harvester having a leveling system according to still another embodiment of the present invention. FIGS. 13A to 13D are views schematically illustrating a state where an outer wall of a protector housing is removed, in which FIG. 13A is a schematic view illustrating a state where step frame and foot steps are folded and seated inside a step protector, FIGS. 13B and 13C are schematic views illustrating a state where a step frame and foot steps are rotated toward the outside and inside of a step protector by the driving of a folding actuator, and FIG. 13D is a schematic view illustrating a state where a step frame and foot steps are fully exposed to form stairs.

As illustrated in FIGS. 3 and 4, a step apparatus for heavy construction equipment and tree harvester having a leveling system 11 for supporting the inclination of a cab 9 and an upper frame 1 according to an embodiment of the present invention includes a step protector 20 including a main body 21 fixedly installed on one side of the upper frame 1, a step guide hole 22 opened from an inside of the main body 21 to an outside, a guide rail 24 formed along a length direction of an inner side wall 23 of the main body 21, and an insert hole 25 formed on one side of the guide rail 24 and open toward a vertically upward direction of the guide rail 24; a side step 30 including a plurality of foot steps 32 arranged at specified intervals on a step frame 31 to form stairs, a step drawer 33 formed on an upper part of the step frame 31 and seated in the step guide hole 22, and a guide pin 34 positioned adjacent to the step drawer 33 and projected toward the side wall 23 of the main body, wherein when the guide pin 34 is slid along the guide rail 24, the step frame 31 is seated in the main body 21 or is drawn out from the inside of the main body 21; and a folding actuator 36 including a cylinder rod 35 coupled to the step drawer 33 to be extended and contracted, the folding actuator 36 drawing the step drawer 33 to the inside of the main body 21 of the step protector 20.

The folding actuator 36 is rotatably fixed to a first mounting flange 37 formed inside the main body 21, and the cylinder rod 35 is rotatably fixed to a second mounting flange 38 formed on one side of the step drawer 33.

In the embodiment of the present invention, for a rotatable construction, hinge pins 39 are coupled to mounting blocks 36a seated inside the mounting flanges 37 and 38, respectively, or a shaft corporate body in which bushing is installed is constructed on the hinge pins 39.

Also, as illustrated in FIG. 4, a slid 27 is formed adjacent to the step guide hole 22 on a main body bottom part 26 of the step protector 20.

The step guide hole 22 is penetratingly formed on a side part in the length direction of the main body 21 of the step protector 20.

Also, a step support 40 is attached to one side of the main body bottom part 26 of the step protector 20, and has an inclined support part 41 adjacent to the slit 27, wherein when the step frame 31 is at a standing posture toward a lower part of the main body 21 of the step protector 20, the step frame 31 is supported at specified inclination angle θ1 by the inclined support part 41.

Preferably, as illustrated in FIGS. 5A to 6B, the inclined support part 41 is formed to be tilted in an angle range of about 65° to 80° against a horizontal surface H formed in the length direction of the main body bottom part 26 of the step protector 20, and thus the step frame 31 forms inclined steps when it stands up toward the lower part of the main body 21 of the step protector 20.

For example, it could be understood that when the step frame 31 is rotated at maximum toward the lower part of the main body 21 of the step protector 20, one side of the step frame 31 can keep the inclined standing posture at a projection angle θ1 in the range of about 65° to 80° against the horizontal surface H formed in the length direction of the main body bottom part 26 of the step protector 20.

Also, a handle 31b is formed on one side of the step frame 31, and the foot step 32 has a plurality of projection parts 32a formed thereon.

In consideration of safety, the handle 31b and the foot steps 32 having the projection parts 32a are connected to the step frame 31, and their arrangements and shapes can be diversely modified.

A safety cover 42 is installed on the lower part of the step frame 31, and serves to seal the inside of the main body 21 on the guide hole 22 when the step frame 31 is completely seated in the main body 21 of the step protector 20 or completely inserted into an inner space of the main body 21.

In the embodiment of the present invention, the folding actuator 36 is connected to a predetermined pressure tank (not illustrated) to extend or contract the cylinder rod 35, and in this case, the pressure tank provides hydraulic pressure or air pressure to the folding actuator 36.

On the other hand, as illustrated in FIG. 7, the step apparatus according to an embodiment of the present invention further includes a safety lever 43 installed inside the cab 9 to change a present mode to a safety mode or an operation mode. If the safety lever 43 is in the safety mode, the step frame 31 is drawn out to the outside the main body 21 of the step protector 20 by the driving of the folding actuator 36, while if the safety lever 43 is in the operation mode, the step frame 31 is unfolded and seated inside the main body 21 of the step protector 20 by the driving of the folding actuator 36.

In diverse embodiments of the present invention, the extension or contraction of the folding actuator 36 can be separately set according to an inclination control range of the leveling system 14 preset by a level controller (not illustrated).

The unexplained reference numeral "28" denotes an upper cover sealing the upper part of the main body 21 of the step protector 20, "29" denotes a fixing member such as a bolt, "44" denotes an operator's seat, "45" denotes a console box, and "46" denotes a working device control lever.

Hereinafter, the operation principle of the step apparatus for heavy construction equipment and tree harvester having a leveling system according to an embodiment of the present invention will be described.

First, in the case where an operator gets on or off the equipment to approach the upper frame 1, the cab 9, or the engine room 11 for repair or operation of the equipment, the step frame 31 is drawn out to the outside of the main body 21 of the step protector 20 and folded to form stairs inclined at a specified angle.

As illustrated in FIGS. 5A to 6B, by the extension operation of the folding actuator 36 that supports the step frame 31 with a preset pressure in the main body 21 of the step protector 20, the cylinder rod 35 connected to the mounting block 36a through a mounting flange 38 is extended to push the step drawer 33, and thus the guide pin 34 is slid toward the guide hole 22 formed on one end part of the step protector main body 21 along the guide rail 24.

In the above-described sliding process, as the step drawer 33 becomes adjacent to the step support 40, the center of gravity moves to the outside of the main body 21 of the step protector 20, and thus the step frame 31 is rotated toward the ground surface by its own weight.

Finally, when the guide pin 34 coupled to the upper part of the step frame 31 passes the insert hole 25 and is positioned at the end part in a length direction of the guide rail 24, the step frame 31 forms the maximum turning moment toward the ground surface, starting from the guide pin 34, and thus the upper part of the step frame 31 gets out of the insert hole 25 to rotate downward or counterclockwise while the step drawer 38 is engaged with the mounting block 36a of the cylinder rod 35 and the first mounting flange 38 to draw the load of the step frame 31.

The rotation of the step frame 31 continues until one side of the step frame 31, e.g. the bottom part 31a of the step frame 31, becomes in contact with the inclined part 41 of the step support 40, and the step frame is at a standing posture at a specified inclination angle θ by the support of the step support 40 to form the stairs for getting on/off the equipment.

According to the present invention, the step frame 31 is rotated toward the lower part of the main body 21 of the step protector 20 by its own weight, and when it is supported by the step support 40 and the inclined part 41 of the step support 40, it is folded at an angle of about 65° to 80° against the horizontal surface H that is formed in the length direction of the main body bottom part 26 of the step protector 20 to keep the inclined standing posture.

Accordingly, a worker or an operator can easily get on/off the equipment to reach the upper frame 1, the cab 9, and the engine room 11 using the foot steps 32 of the step frame 31 as footholds.

By contrast, in the case where an operator intends to prevent collision between an external object and the step frame 31, the step frame 31 and the foot steps 32 are rotated and slid to be seated inside the main body 21 of the step protector 20 by the contraction operation of the folding actuator 36 and the cylinder rod 35.

That is, by the contraction operation of the folding actuator 36, to which pressure preset to support the load of the step frame 31 and the foot steps 32 has been provided, the cylinder rod 35 connected to the mounting block 36a and the mounting flange 38 is contracted to pull the step drawer 33 to the inside of the main body 21 of the step protector 20, and thus the bottom part 31a of the step frame 31, which is at the inclined standing posture, is rotated clockwise, starting from the inclined part 41 of the step support 40.

At this time, the clockwise rotation of the step frame 31 continues until the upper part of the step frame 31 that is adjacent to the step drawer 33 is inserted into the insert hole 25. Then, by the contraction operation of the folding actuator 36 and the cylinder rod 35, the guide pin 34 is slid along the guide rail 24 toward the inside of the step protector main body 21 and the end part of the guide rail 24.

The sliding movement of the step frame 31 is performed roughly in parallel to the horizontal surface H of the main body bottom part 26 of the step protector 20 by the engagement of the guide pin 34 with the guide rail 24, and when the step frame 31 is sufficiently slid, the safety cover 42 formed on the lower part of the step frame 31 becomes in close contact with the guide hole 22 for closing of the inside of the step protector main body 21.

Accordingly, the step frame 31 is kept in a seated state in the main body 21 of the step protector 20, without being exposed, to prevent collision with an external obstacle, and even if the upper frame 1 is tilted in any direction by the leveling system 14, no collision occurs between the step frame 31 and the lower driving structure.

On the other hand, as illustrated in FIG. 7, in the case where the safety lever 43 is connected to preset the pressure control range of the folding actuator 36, the step apparatus can be selectively used in accordance with the operation mode of the safety lever 43.

That is, if the safety lever 43 is set to be in a safety mode by an operator (e.g. if the safety lever is rotated counterclockwise), the folding actuator 36 and the cylinder rod 35 are extended by a preset pressure, and the step frame 31 and the foot steps 32 are installed at an inclined standing posture against the main body 21 of the step protector 20. In the case of an operation mode (e.g. if the safety lever is rotated clockwise), the folding actuator 36 and the cylinder rod 35 are contracted by the preset pressure, and the step frame 31 and the foot steps 32 are folded to be seated inside the main body 21 of the step protector 20. Since the rotation or sliding of the step frame 31, which is performed to fold the step frame 31, is the same as described above, the detailed description thereof will be omitted.

As illustrated in FIG. 8, it is more profitable in cost saving to attach the step apparatus according to the present invention to a side protector 1a of the upper frame 1 adjacent to the cab 9.

Hereinafter, a step apparatus for heavy construction equipment and tree harvester having a leveling system according to another embodiment of the present invention will be described in detail.

As illustrated in FIGS. 9 to 12, a step apparatus for heavy construction equipment and tree harvester having a leveling system for controlling a horizontal level of an upper frame 1 on which a cab 9 is mounted when the equipment is inclined against the ground surface according to another embodiment of the present invention includes a step protector 110 including a cylinder fixing holder 112 formed inside a protector housing 111, first and second fixing lugs 113 and 114 respectively formed apart from the cylinder fixing holder 112 along a length direction of the protector housing 111, and a step protection cover 116 attached to a lower part of the protector housing 111 and having a step receiving hole 115 penetratingly formed thereon to communicate with an inner part of the protector housing 111, the step protector 110 being fixedly installed on one side of the upper frame 1; a first step frame 120 including a first lug support flange 121 coupled to the first fixing lug 113, and a plurality of step support flanges 122 formed apart from the first lug support flange 121, wherein the first lug support flange 121 and the first fixing lug 113 are rotatably fixed to each other; a second step frame 130 including a second lug support flange 131 coupled to the second fixing lug 114, a plurality of step support flanges 132 formed apart from the second lug support flange 131, and a fixing cam 133 formed adjacent to the second lug support flange 131 to support a rotating force generated about a rotating shaft 118 formed on the second lug support flange 131, wherein the second lug support flange 131 and the second fixing lug 114 are rotatably fixed to each other; foot steps 104 fixed to the plurality of step support flanges 122 and 132 formed in the first step frame 120 and the second step frame 130, respectively; and a folding actuator 136 including a rod 135 that can be extended and contracted, and having one side connected to the cylinder fixing holder 112 and the other side connected to the fixing cam 133, the folding actuator 136 providing the rotating force to the fixing cam 133 by a predetermined pressure.

The first lug support flange 121 and the first fixing lug 113 are rotatably fixed to the first step frame 120 by a hinge pin 117. The hinge pin 117 and a rotating shaft 118 serve to support the rotation of the first step frame 120 and the second step frame 130.

In the embodiment of the present invention, at least one of the first and second step frames 120 and 130 has a projection angle θ2 and is fixed with an inclination so that at least one of the foot steps 104 is projected to an outside of an outer wall 112b of the step housing 111 when the first and second step frames 120 and 130 are exposed to an outside of the step protector 110 at maximum.

As illustrated in FIGS. 3 and 4, the step frames 120 and 130 may have a specified projection angle θ2 and may be fixed with an inclination when the inner side wall 112a of the protector housing 111 is attached to one side surface 1a of the upper frame 1. Accordingly, it could be understood that, in order for at least one foot step 104 to be projected, the protector housing 111 is attached to one side of the upper frame 1 at a specified inclination angle against the horizontal surface H of the upper frame 1.

It is preferable that the projection angle θ2 of the step frame 120 or 130 is in the range of 5° to 40°. Accordingly, it could be understood that at least one of the foot steps 104, e.g. the foot step 104 forming an upper step, forms a step projected at an inclination angle of 5° to 40° toward the outside of the outer wall 112*b* of the step housing 111 when the first step frame 120 and the second step frame 130 are exposed to the outside of the step protector 110 at maximum.

In constructing the step protector 110, a step protection cover 116 is mounted on the lower part of the protector housing 111 through a plurality of fixing members 105. However, the step protection cover and the protector housing may be formed in a body by welding or molding.

Also, it is preferable that the fixing cam 133 is formed in a body with the second step frame 130 to have an all-in-one fixing cam or flange structure extended from the second lug support flange 131.

In the embodiment of the present invention, the foot steps 104 are rotatably shaft-engaged with step support flanges 122 and 132 by step fixing pins 119*a* and 119*b*, and a support link 129 for distributing the load of the foot steps 104 is formed at both front end parts of the step fixing pins 119*a* and 119*b*.

Also, in the embodiment of the present invention, a safety cover is further installed in the lower part of the foot steps 104. It is preferable that the safety cover 106 is arranged in parallel in a line of lower end parts of the first step frame 120 and the second step frame 130 so that the safety cover can close a step receiving hole 115 formed on a step protection cover 116 when the foot steps 104 are seated inside the protector housing 111.

The safety cover 106 is fixed to the foot step 104 in a body so that it can move together with the foot step 104, and during assembling, it is connected or fixed to a bottom surface of the foot step 104 by welding or through a bolting process.

As illustrated in FIG. 10C, the folding actuator 136 serves to provide an external force to push or pull one side of the second step frame 130. The folding actuator 136 may be an air pressure cylinder, but it is preferable that it is a hydraulic cylinder that receive hydraulic fluid from a hydraulic pump (not illustrated) installed adjacent to the engine room 11 through a hose connection part 141*b* or 141*c*.

The folding actuator 136 receives a preset pressure through a cylinder housing 141, and includes a rod 135 having a mounting block 144 that is rotatably fastened to the fixing cam 133 formed on the upper part of the second step frame 130. A fixing part 141*a* of the cylinder housing 141 is rotatably coupled to the cylinder holder 113.

In the embodiment of the present invention, the term "rotatable coupling" includes a typical pin fixing type and a bushing fixing type using a bushing 118*a* for wear prevention. Although not illustrated in the drawing, it could be understood that a mechanical link can be added thereto.

On the other hand, the step apparatus for heavy construction equipment and tree harvester using a leveling system according to the embodiment of the present invention further includes a safety lever 43 installed inside the cab 9 to selectively change the present mode to a safety mode or an operation mode.

Referring to FIGS. 13A to 13D, the safety lever 43 typically generates a mode change signal so that hydraulic fluid from the hydraulic pump (not illustrated) is provided to the cylinder housing 141 of the folding actuator 136. In the safety mode, the second step frame 130 is rotated (clockwise as shown in the drawing), starting from the fixing position of the second lug support flange 131 and the rotating shaft 118, to be drawn out to the outside of the step protector 110 by the driving of the folding actuator 136, while in the operation mode, the second step frame 130 is rotated counterclockwise as shown in the drawing to be folded inside the step protector 110 by the driving of the folding actuator 136.

Also, by the rotating force being applied to the fixing cam 133 by the folding actuator 136, the first step frame 120 is fixedly installed on the step receiving hole 115 when the second step frame 130 is folded.

As illustrated in FIG. 13D, when the second step frame 130 is folded to be positioned inside the protector housing 111, the first step frame 120 or the outer surface 120*a* of the first step frame 120 serves as a specified protection cover that is extended from the step protection cover 116.

Also, when the second step frame 130 is folded and fixed inside the protector housing 111 by the rotating force generated by the folding actuator 136, the safety cover 106 is arranged on the step receiving hole 115 to serve as a specified protection cover adjacent to the outer surface 120*a* of the first step frame 120.

Accordingly, the lower part of the step protector 110 is blocked from the outside by the safety cover 106 connected to the outer surface 120*a* of the first step frame 120 and the foot step 104, and thus invasion of an external obstacle such as tree, stone, and the like, into the protector housing 111 is prevented.

In diverse embodiments of the present invention, the extension or contraction of the folding actuator 36 can be separately set according to an inclination control range of the leveling system 14 preset by a level controller (not illustrated).

The unexplained reference numeral "104*a*" denotes a pin hole formed to fix the foot step, "108" denotes a fixing member including bolts, and "112*c*" denotes side cover of the protector housing.

Hereinafter, the operation principle of the step apparatus for heavy construction equipment and tree harvester having a leveling system according to another embodiment of the present invention will be described.

According to the step apparatus according to another embodiment of the present invention, when the step apparatus is not in use as illustrated in FIG. 13*a*, the first step frame 120 and the outside of the safety cover 106 roughly closes the step receiving hole 115, and the first step frame 120, the second step frame 130, and the foot steps 104 are seated inside the protector housing 111.

By contrast, when the step apparatus is in use, the foot steps 104, the first step frame 120 and the second step frame 130 are exposed to an outside of the outer wall 112*b* of the protector housing 110 mounted on the upper frame to form the stairs.

That is, if pressure is applied from the hydraulic pump (not illustrated) to the folding actuator 136 installed in the protector housing 111 to form the stairs, the rod 135 is extended to apply a specified rotating force to the fixing cam 33 fixed to the upper part of the second step frame 130.

The rotating force produces a turning moment clockwise as shown in the drawing around the fixing point of the second lug support flange 131 fixed to the second fixing lug 114 and the rotating shaft 118. Accordingly, as illustrated in FIG. 13B, the lower part of the second step frame 130 is rotated clockwise around the rotating shaft 118.

The rotating force of the second step frame 130 is transferred to the first step frame 120 through the step support flanges 121 and 131 and the support link 129 supporting the foot steps 104. In this process, the first step frame 120 is rotated clockwise by the rotating force of the second step frame 129, and the first and second step frames 120 and 130 are exposed to an outside of the protector housing 111 in an inclined standing posture (See FIGS. 13C and 13D).

At this time, the first and second step frames 120 and 130 are exposed to the outside of the outer wall 112b of the protector housing 111, and when they are exposed at maximum, they form a standing posture having a projection angle θ2 in the range of 5° to 40°.

This means that the foot steps 104 form the stairs projected at an inclined angle of 5° to 40° against the horizontal surface H of the upper frame 1. Here, the projection angle θ2 can be modified to secure a good visual field of the operator.

On the other hand, when the step apparatus is not in use, the foot steps 104 and the step frames 120 and 130, which form the stairs, are folded and seated inside the protector housing 110 mounted on the upper frame 1. That is, if the hydraulic fluid is supplied from the hydraulic pump (not illustrated) to the folding actuator 136 installed in the protector housing 111 through the hose connection part 141b or 141c, the rod 135 is contracted, and a rotating force is formed on the fixing cam 133 fixed to the upper part of the second step frame 130.

The rotating force produces a turning moment counterclockwise as shown in the drawing around the fixing point of the second lug support flange 131 fixed to the second fixing lug 114 and the rotating shaft 118. Accordingly, the lower part of the second step frame 130 is rotated counterclockwise around the rotating shaft 118.

The rotating force of the second step frame 130 is transferred to the first step frame 120 through the step support flanges 121 and 131 and the support link 129 supporting the foot steps 104. In this process, the first step frame 120 is drawn counterclockwise by the rotating force of the second step frame 130 rotated clockwise by the rotating force of the second step frame 130, and the first and second step frames 120 and 130 are rotated toward the inside of the protector housing 111 (See FIGS. 13C and 13D).

The rotation of the first and second step frames 120 and 130 is performed toward the inside of the step receiving hole 115 of the protector housing 111 mounted on one side surface 1a of the upper frame 1, and if the rotation of the first step frame 120 and the second step frame 130 is sufficiently performed by the contraction operation of the rod 135 of the folding actuator 136, the second step frame 120 and the foot steps 104 are fixedly arranged on the inner part of the protector housing 111 and the upper part of the step protection cover 116.

In addition, the first step frame 120 and the outer surface of the safety cover 106 are installed to close the step receiving hole 115 of the step protection cover 116, and thus serve as a sealing door for blocking the inside of the protector housing 111.

Accordingly, when the step apparatus according to the present invention is not in use, the foot steps 104 and the step frames 120 and 130 are kept in a seated state in the protector housing 111, without being exposed, to prevent collision with an external obstacle, and even if the upper frame 1 is tilted in any direction by the leveling system 14, interference or collision between the step frames 120 and 130 and the foot steps 104 and the lower driving structure 2 can be prevented.

FIG. 12 is a perspective view schematically illustrating an installation state of the step apparatus for heavy construction equipment and tree harvester having a leveling system on the upper frame 1 adjacent to an inlet of the cab 9 according to still another embodiment of the present invention. In this embodiment of the present invention, the foot steps 104 and the step frames 120 and 130 are built in the side protector 1a of the upper frame 1, and thus the manufacturing cost is further reduced.

On the other hand, as illustrated in FIG. 7, in the case where the safety lever 43 is connected to preset the pressure control range of the folding actuator 136, the step apparatus can be selectively used in accordance with the operation mode of the safety lever 43.

That is, if the safety lever 43 is set to be in the safety mode by an operator, e.g. if the safety lever is rotated counterclockwise, the cylinder rod 135 of the folding actuator 136 is extended by the preset pressure, and the first step frame 120 and the foot steps 104 are rotated clockwise around the rotating shaft 119 of the second lug support flange 131 to form the stairs projected at a specified angle on the outside of the protector housing 111, while if the safety lever is set to be in the operation mode, e.g. if the safety lever is rotated clockwise, the folding actuator 136 and the cylinder rod 135 are contracted by the preset pressure, and the second step frame 130 rotates the rotating shaft 119 of the second lug support flange 131 counterclockwise, and the foot steps 104 and the step frame 120 and 130 are seated inside the protector housing 111.

As described above, according to the step apparatus for heavy construction equipment and tree harvester having a leveling system according to the present invention, since the foot steps and the step frames are exposed to an outside of the step protector through the folding operation when the step apparatus is in use, while they are protected inside the step protector when the step apparatus is not in use, collision with an external obstacle or the lower driving structure and the damage of the step apparatus can be prevented.

Also, since the folding operation of the step frames is performed by the folding actuator depending on whether the safety lever is operated, the operator's manual operation of the steps is not required, and the step control performance is greatly improved.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A step apparatus for heavy construction equipment and tree harvester having a leveling system for controlling a horizontal level of a cab and an upper frame, comprising:
a step protector including a main body fixedly installed on one side of the upper frame, a step guide hole opened from an inside of the main body to an outside, a guide rail formed along a length direction of an inner side wall of the main body, and an insert hole formed on one side of the guide rail and open toward a vertically upward direction of the guide rail;
a side step including a plurality of foot steps arranged at specified intervals on a step frame to form stairs, a step drawer formed on an upper part of the step frame and seated in the step guide hole, and a guide pin positioned adjacent to the step drawer and projected toward the side wall of the main body, wherein when the guide pin is slid along the guide rail, the step frame is seated in the main body or is drawn out from the inside of the main body;
a folding actuator including a cylinder rod coupled to the step drawer to be extended and contracted, the folding actuator drawing the step drawer to the inside of the main body of the step protector; and a safety lever installed inside the cab to change a present mode to a safety mode or an operation mode;

wherein if the safety lever is in the safety mode, the step frame is folded outside the main body of the step protector by the driving of the folding actuator, while if the safety lever is in the operation mode, the step frame is unfolded and seated inside the main body of the step protector by the driving of the folding actuator;

wherein the folding actuator is rotatably fixed to a first mounting flange formed inside the main body, and the cylinder rod is rotatably fixed to a second mounting flange formed on one side of the step drawer;

wherein a slit is formed adjacent to the step guide hole on a main body bottom part of the step protector, and one side of the step frame is slidable up and down along the slit;

wherein a step support is attached to one side of the main body bottom part of the step protector and has an inclined support part adjacent to the slit;

wherein when the step frame extends from a lower part of the main body of the step protector, the step frame is supported at a specified inclination angle by the inclined support part; and wherein a safety cover is disposed on a lower part of the step frame and seals the inside of the main body on the guide hole when the step frame is completely seated in the main body of the step protector.

2. The step apparatus of claim 1, wherein the step guide hole is penetratingly formed on a side part in the length direction of the main body of the step protector.

3. The step apparatus of claim 1, wherein the inclined support part is formed to be tilted in an angle range of about 65° to 80° against a horizontal surface formed in the length direction of the main body bottom part of the step protector.

4. The step apparatus of claim 1, wherein a handle is formed on one side of the step frame.

5. An apparatus comprising:
(a) a cab;
(b) an upper frame;
(c) a leveling system for controlling a horizontal level of the cab and the upper frame;
(d) a step protector including a main body fixedly installed on one side of the upper frame, a step guide hole extending from an inside to an outside of the main body, a guide rail formed along a length of an inner side wall of the main body, an insert hole formed on one side of the guide rail and opening in a vertically upward direction of the guide rail when the apparatus is in an operating position;
(e) stairs comprising a step frame and a plurality of foot steps disposed at intervals on the step frame, a step drawer formed on an upper part of the step frame, the step drawer being seated in the step guide hole, and a guide pin disposed adjacent to the step drawer and projecting toward the inner side wall of the main body, wherein the step frame can be moved between a first position seated in the main body to a second position extending from the main body when the guide pin is slid along the guide rail; and
(f) means for supporting the step frame at a defined angle with respect to a horizontal surface of the main body when the step frame is in the second position extending from the main body; and
(g) a lower driving structure, wherein a bottom of the step frame is disposed above the lower driving structure when the step frame is in the second position extending from the main body and the apparatus is in the operating position.

6. The apparatus according to claim 5, wherein the step frame further comprises means disposed on the bottom of the step frame for sealing the main body on the guide hole when the step frame is in the first position seated in the main body.

7. The apparatus according to claim 5, comprising a slit formed adjacent to the step guide hole on a main body bottom part of the step protector, wherein one side of the step frame is slidable along the slit, and wherein the means for supporting the step frame at a defined angle comprises a step support attached to one side of the main body bottom part of the step protector that has an inclined support part adjacent to the slit.

* * * * *